(12) United States Patent
Koch et al.

(10) Patent No.: US 11,402,999 B2
(45) Date of Patent: Aug. 2, 2022

(54) ADAPTIVE WEAR LEVELING USING MULTIPLE PARTITIONS

(71) Applicant: Burlywood, Inc., Longmont, CO (US)

(72) Inventors: Nathan Koch, Longmont, CO (US); John William Slattery, Boulder, CO (US); Amy Lee Wohlschlegel, Lafayette, CO (US); Kevin Darveau Landin, Longmont, CO (US); Christopher Bergman, Erie, CO (US)

(73) Assignee: Burlywood, Inc., Longmont, CO (US)

( * ) Notice: Subject to any disclaimer, the term of this patent is extended or adjusted under 35 U.S.C. 154(b) by 0 days.

(21) Appl. No.: 17/110,393

(22) Filed: Dec. 3, 2020

(65) Prior Publication Data

US 2021/0165576 A1    Jun. 3, 2021

Related U.S. Application Data

(60) Provisional application No. 62/942,931, filed on Dec. 3, 2019.

(51) Int. Cl.
*G06F 3/06* (2006.01)
(52) U.S. Cl.
CPC .......... *G06F 3/0616* (2013.01); *G06F 3/0644* (2013.01); *G06F 3/0659* (2013.01); *G06F 3/0679* (2013.01); *G06F 2212/7211* (2013.01)
(58) Field of Classification Search
CPC .... G06F 3/0616; G06F 3/0644; G06F 3/0659; G06F 3/0679; G06F 3/0652; G06F 2212/7211
See application file for complete search history.

(56) References Cited

U.S. PATENT DOCUMENTS

| | | | |
|---|---|---|---|
| 10,725,668 B1 * | 7/2020 | Tang | G06F 3/0652 |
| 10,754,587 B2 | 8/2020 | Earhart | |
| 2002/0144066 A1 * | 10/2002 | Talreja | G11C 16/26 711/154 |
| 2007/0083698 A1 | 4/2007 | Gonzalez et al. | |
| 2007/0174549 A1 | 7/2007 | Gyl et al. | |
| 2009/0240873 A1 | 9/2009 | Yu et al. | |
| 2010/0088461 A1 | 4/2010 | Yang et al. | |
| 2010/0174851 A1 | 7/2010 | Leibowitz et al. | |
| 2011/0246705 A1 * | 10/2011 | Mudama | G11C 16/3495 711/103 |
| 2014/0006898 A1 | 1/2014 | Sharon et al. | |
| 2018/0275923 A1 * | 9/2018 | Earhart | G06F 3/0653 |
| 2020/0409589 A1 * | 12/2020 | Bennett | G06F 3/0679 |

OTHER PUBLICATIONS

International Application No. PCT/US2020/062968, International Search Report & Written Opinion, 8 pages, dated Mar. 2, 2021.

\* cited by examiner

*Primary Examiner* — Kalpit Parikh

(57) ABSTRACT

A storage device for adaptive wear leveling within a data storage system is provided. The storage device includes a host interface configured to receive storage operations for storage and retrieval of data on storage media, a media interface configured to read and write data to the storage media, and a storage controller configured to provide wear leveling for the storage media using a plurality of partitions within the storage media.

18 Claims, 4 Drawing Sheets

ADAPTIVE WEAR LEVELING USING MULTIPLE PARTITIONS

RELATED APPLICATIONS

This application hereby claims the benefit of and priority to U.S. Provisional Patent Application No. 62/942,931, titled "Adaptive Wear Leveling Using Multiple Partitions", filed on Dec. 3, 2019 and which is hereby incorporated by reference in its entirety.

TECHNICAL FIELD

Aspects of the disclosure are related to data storage and in particular to an adaptive wear leveling method within a storage system.

TECHNICAL BACKGROUND

Storage systems are complicated and multi-layered. The behavior (performance, life, reliability, etc.) of the storage devices in these systems is highly dependent on the traffic patterns presented to the devices. Data written to a storage system may be considered to belong to one of two classifications. Hot data is data that is frequently written and re-written to the storage system, while cold data is data that is written to the storage system and then rarely overwritten.

Separating hot and cold data before it reaches the final storage device can increase drive life and performance. Newer drive protocol specifications provide interfaces that provide a way to potentially write hot and cold data to different partitions (e.g. NVM Express (NVMe) namespaces or Non-Volatile Memory Host Controller Interface Specification (NVMHCIS) namespaces).

However, one problem is that the software layers that data is filtered through on the way to the end storage device are constantly changing and increasing in complexity. For example, there could be many applications running simultaneously on a server, generating significantly different data patterns compared to those written to a single filesystem. The filesystem itself could generate metadata that is also saved with the original data. Layers of software could break up data to be written to multiple devices. Large software caches could be in use. The result is that it is very difficult to control exactly what data patterns the storage device at the very bottom of the stack will encounter. Therefore, an algorithm implemented in the storage device itself that can successfully separate hot and cold data can provide a great benefit for handling unpredictable data patterns.

Overview

In an embodiment, a storage device for adaptive wear leveling within a data storage system is provided. The storage device includes a host interface configured to receive storage operations for storage and retrieval of data on storage media, a media interface configured to read and write data to the storage media, and a storage controller configured to provide wear leveling for the storage media using a plurality of partitions within the storage media.

In a further embodiment, a method for operating a storage device within a data storage system is provided. The method includes receiving storage operations for storage and retrieval of data on storage media within the storage device from a host through a host interface, and creating a plurality of partitions within the storage media.

The method also includes reading and writing data to the multiple partitions within the storage media through a media interface, and providing wear leveling for the storage media using the plurality of partitions within the storage media as directed by a storage controller.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
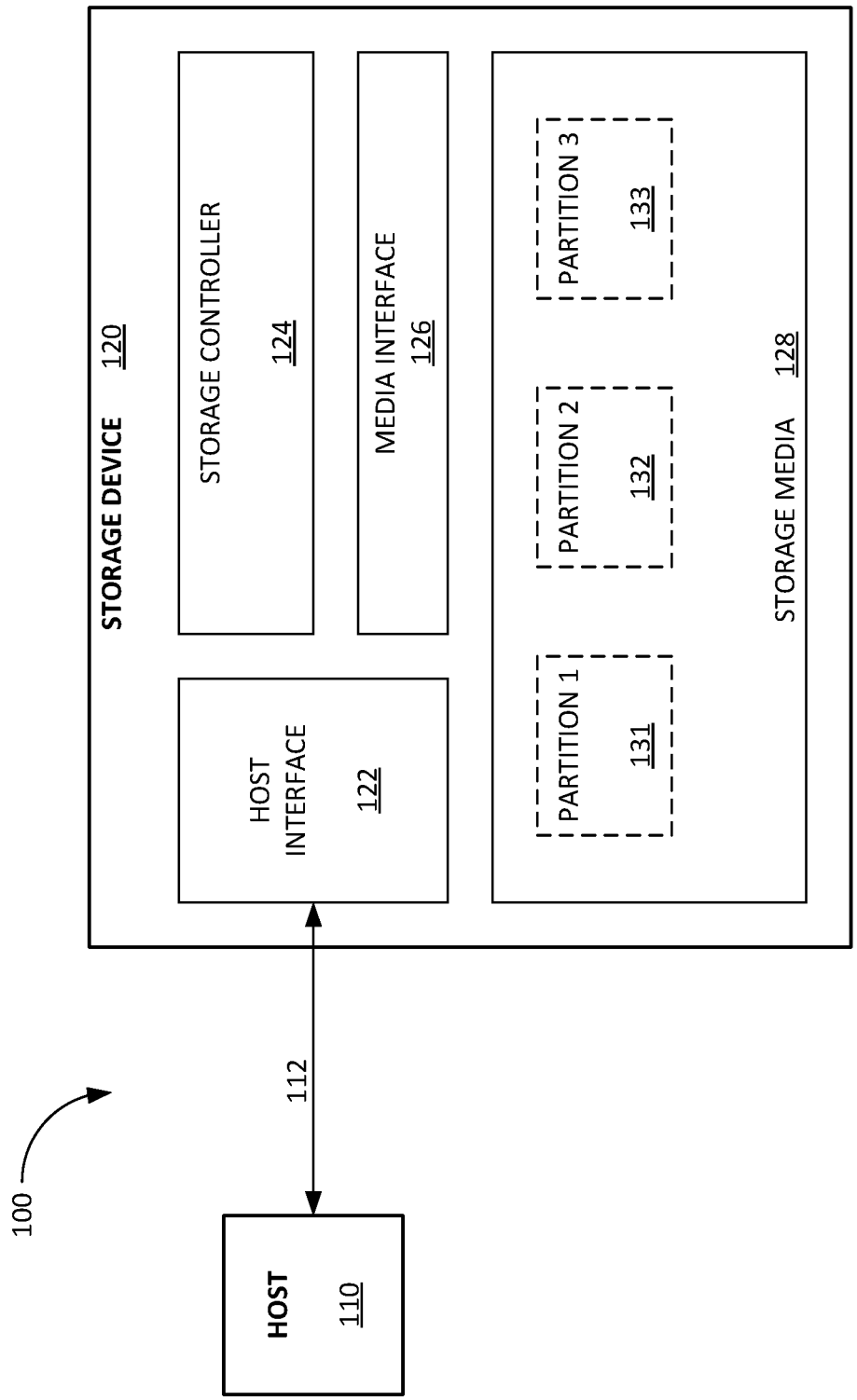
FIG. 1 illustrates a data storage system.

The example embodiments described herein illustrate different methods for adaptive wear leveling within a data storage system. An adaptive wear leveling method is discussed below that allows for the separation of hot and cold data while increasing the life and performance of the data storage system when a mixture of hot and cold data are present. Note that this method does not depend on any prior knowledge about the mixture of hot and cold data.

A number of technical terms and abbreviations are used in describing the various embodiments of the adaptive wear leveling system described below and are defined as follows.

SSD: Solid-state Storage Device. A storage device that uses NAND flash or other non-volatile storage technology to store data on storage media. Also referred to as a 'drive' herein. An SSD can include a quantity of individual storage media chips or storage media dies which together form the SSD.

EOL: End-of-life. When too many locations in the storage media in the SSD can no longer be programmed or read reliably due to a high number of erase cycles, the drive reaches end of life.

Host: An application that writes data to an SSD.

LBA: Logical block address. A range of LBAs and their size is provided to the SSD user. The total number of addresses multiplied by the size of data that can be stored at each address is equal to the advertised capacity of the drive. The host writes to and reads from the drive using these logical addresses. The details of where these LBAs are written to physical media is not provided to the SSD user.

LBA Space: Part or all of the range of LBAs provided to the SSD user.

Hot Data: LBAs that are written to the SSD and then re-written frequently during the life of the SSD. Note that hot LBAs are not defined as a function of how often they are read.

Cold Data: LBAs that are written to the SSD either once or very infrequently over the life of the SSD.

Write amplification or write amp: The ratio of the number of bytes written to the physical media to the number of bytes requested to be written by the host. When the write amplification is low, the SSD throughput is increased. A workload/method combination that results in low write amplification is considered 'higher performance'. A lower write amplification can also improve read performance, as there will be fewer internal operations getting in the way of reads when a mixture of writes and reads are present.

Over-provisioning (OP): The amount of extra bytes of the storage media available after writing the entire LBA space once. If it takes x amount of the storage media to write the entire LBA space, but the drive has x*1.5 total bytes, the overprovisioning is 50%.

Drive fill: A drive fill is complete when the host has written a number of LBAs equal to the total number of LBAs that the SSD supports (although some LBAs could be written more than once and others could be not written at all).

Drive life: The number of drive fills that can performed before the drive reaches EOL.

Workload: The pattern of data written to and read from the drive. A workload in a generic sense often specifies things like write and read sizes and the ratio of writes to reads. However, for purposes of the example embodiments described herein, only these aspects of a workload are relevant:
 which LBAs are written;
 how many LBAs are written;
 whether the writes contain hot or cold data;
 the ratio of the total number of hot LBAs to cold LBAs in the address space; and
 the ratio of hot LBAs to cold LBAs in time as data is written, hereafter the 'temporal' ratio.

Benchmark Test: Tests under which drive performance and life is measured and specified, mainly comprised of 100% random workloads (where steady state write amp is considered to be worst-case) and 100% sequential workloads (where steady state write-amp is considered to be best case).

Valid data: A location in the storage media where the most recent copy of an LBA written by the host resides.

Invalid data: A location in the storage media that used to contain the most recent copy of an LBA, but that LBA has subsequently been re-written by the host or internally to the drive to a different location, leaving the previous location 'invalid'.

Wear Score: A higher wear score for a particular storage media location means that it is closer to wearing out. For purposes of illustration in this document, the erase count of a particular block determines its wear score. There could be other factors contributing to a higher wear score that are not included in the example embodiments described below.

Block: The granularity at which a portion of the storage media can be erased.

Hot Block: A block with a high wear score relative to other blocks on the drive.

Cold block: A block with a low wear score relative to other blocks on the drive.

Block stripe: Data is normally written to SSD media by choosing one block from each storage die that can be programmed independently, and then striping writes across the blocks in order to maximize throughput by programming data in parallel. These combined blocks comprise a 'block stripe'. Blocks in stripes are not erased until no valid data remains in the entire stripe.

Least-valid block stripe: The block stripe in the drive that has the least number of valid LBAs in it.

Partition: In the example embodiments described below, a partition encompasses a unique block stripe that is being written by a particular firmware module. For example, having 3 partitions means that there are three separate block stripes being written to by 3 different firmware modules in the drive. A partition also encompasses all of the block stripes that have been written by each entity in the past, that haven't been erased yet. The number of block stripes in each partition can vary over time.

Cursor: The firmware entity that writes to block stripes, a component of a partition.

Wear bias: A property of a partition that dictates whether the partition chooses the highest available wear score blocks when forming block stripes ('high wear bias'), or the lowest available blocks ('low wear bias').

Garbage collection (GC): When there are no empty stripes available, the SSD re-writes any remaining valid data in a block stripe to a new location, until the stripe becomes completely invalid and can be erased and reused.

Spare blocks or spares: SSD media chip/die vendors specify the maximum number of erases that any particular block should be able to handle before wearing out, along with a percentage of blocks that may wear out 'early', or at a lower erase count. It is a common practice to reserve this percentage of blocks as spares, in order to guarantee a particular capacity and OP during the life of the drive as some blocks start going bad early. In the example methods described herein, spares are logical and just represent some number of currently un-written blocks. Blocks can be rotated in and out of the logical spare area.

The model: An experimental model was developed to explore the methods described herein. This model includes a traffic generator and a drive. The traffic generator is used to generate patterns including hot and cold LBAs. Note that the traffic generator component knows whether it is writing hot data (because it has been setup in advance to generate some LBAs more often) or cold data (because it will generate some LBAs less often) and therefore the visual output of the model can be colored according to whether it is hot or cold.

The drive emulates an SSD with regard to storing LBAs on media. This portion of the model does not know which LBAs are hot and cold and the methods described herein do not react to the designation of hot and cold by the traffic generator. The goal is for the methods described herein to follow simple rules that manage the hot and cold data without this knowledge.

Wear leveling: The autonomous movement of data inside the drive itself in an attempt to ensure that all blocks get written an equal number of times. If done correctly, this can improve drive life and performance. The goal of wear leveling generally is to direct cold data to hot blocks (thus lowering the number of times the hot block will be erased in the future) and hot data to cold blocks (thus increasing the number of times the block can be erased in the future as hot data is overwritten).

Greedy Garbage Collection: A greedy garbage collection method always chooses the least-valid block stripe in the system to garbage collect. One example method is implemented within the model using the following rules. When remaining media falls below a threshold, the least-valid block stripe is chosen to be a garbage collection 'victim', and all of the valid data is written to a new block stripe, freeing the blocks in the stripe to be erased and rewritten. As invalid locations are encountered in the victim stripe, new LBAs coming from the host are accepted and written. Since the victim stripe could contain many invalid locations, multiple victims can contribute data to a single destination block stripe.

FIG. 1 illustrates data storage system 100. In this example embodiment of the present invention, data storage system 100 includes host 110 which transfers data for storage to and from storage device 120 through host interface 122 over link 112.

In this example embodiment, storage device 120 includes host interface 122, storage controller 124, media interface 126 and storage media 128. Storage media 128 includes partition 1 131, partition 2 132, and partition 3 133.

Storage controller 124 may take any of a variety of configurations. In some examples, storage controller 124 may be a Field Programmable Gate Array (FPGA) with software, software with a memory buffer, an Application Specific Integrated Circuit (ASIC) designed to be included in a single module with storage media, a set of Hardware Description Language (HDL) commands, such as Verilog or System Verilog, used to create an ASIC, a separate module from storage media 128, or any of many other possible configurations.

Communication link 112 may use the Internet or other global communication networks. Communication link 112 may comprise one or more wireless links that can each further include Long Term Evolution (LTE), Global System for Mobile Communications (GSM), Code Division Multiple Access (CDMA), IEEE 802.11 WiFi, Bluetooth, Personal Area Networks (PANs), Wide Area Networks, (WANs), Local Area Networks (LANs), or Wireless Local Area Networks (WLANs), including combinations, variations, and improvements thereof. The communication links can carry any communication protocol suitable for wireless communications, such as Internet Protocol (IP) or Ethernet.

Additionally, communication link 112 can include one or more wired portions which can comprise synchronous optical networking (SONET), hybrid fiber-coax (HFC), Time Division Multiplex (TDM), asynchronous transfer mode (ATM), circuit-switched, communication signaling, or some other communication signaling, including combinations, variations or improvements thereof. Communication link 112 can each use metal, glass, optical, air, space, or some other material as the transport media. Communication link 112 may be a direct link, or may include intermediate networks, systems, or devices, and may include a logical network link transported over multiple physical links. Common storage links include SAS, SATA, NVMe, Ethernet, Fiber Channel, Infiniband, and the like.

Figure 2:
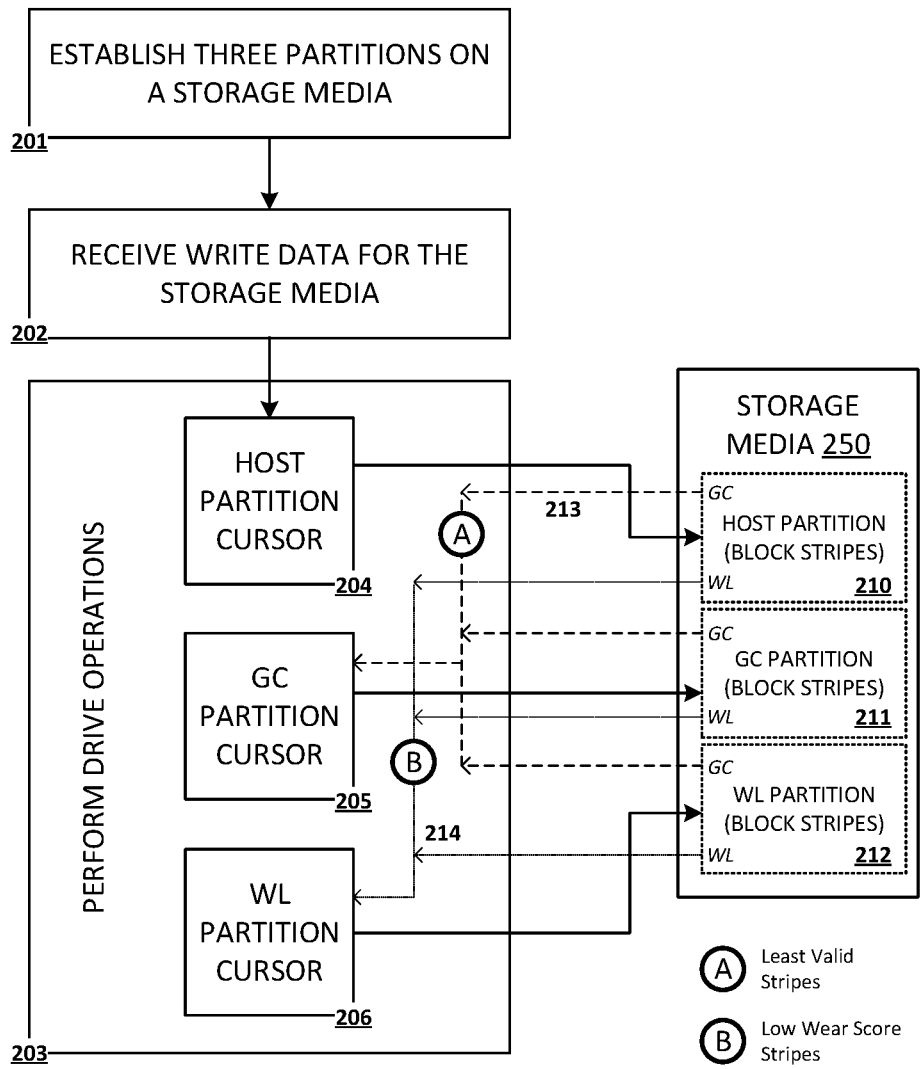
FIG. 2 illustrates a method to perform adaptive wear leveling on multiple partitions within storage media.

The operation of storage system 100 using a method to perform adaptive wear leveling on partitions 1-3 131-133 within storage media 128 is illustrated in FIG. 2 and described in detail below.

FIG. 2 illustrates a method to perform adaptive wear leveling on multiple partitions 210, 211, and 212 within storage media 250. In this example embodiment, storage device 120 establishes three partitions within storage media 250, (operation 201). These three partitions include a host partition 210, a garbage collection partition 211, and a wear leveling partition 212.

Each partition is coupled with a cursor configured to control the reading and writing of data within the partition. In an example embodiment, these cursors 204, 205, and 206 are firmware modules within storage device 120 that instruct storage controller 124 in the writing of block stripes to their corresponding partition through media interface 126. Host partition cursor 204 controls the writing of block stripes to host partition 210, garbage collection cursor 205 controls the writing of block stripes to garbage collection partition 211, and wear leveling partition cursor 206 controls the writing of block stripes to wear leveling partition 212.

Storage device 120 receives write data for storage media 128 from host 110 over link 112, (operation 202). During the normal operation of storage device 120, storage controller 124 performs various storage drive operations, (operation 203).

Storage controller 124 uses host partition 210 to capture incoming data from host 110, and chooses new target blocks within host partition 210 using a low wear bias under direction from host partition cursor 204.

Storage controller 124 uses garbage collection partition 211 when garbage collecting data, again using a low wear bias to choose new target blocks under direction from garbage collection partition cursor 205. Garbage collection victims are chosen by finding the least valid block stripe within any of the three partitions 210, 211, and 212. This is known as greedy garbage collection.

Using a garbage collection partition 211 provides an initial hot-cold data separation, as only data that hasn't yet been overwritten is garbage collected, and new host data is not mixed in with garbage collected data. Using a garbage collection partition 211 also ensures that when a garbage collection victim doesn't entirely fill a new target block stripe, the rest of the block stripe will be filled with the next best garbage collection victim.

Storage controller 124 uses wear leveling partition 212 through the direction of wear leveling partition cursor 206 in order to extend the life of storage drive 120 by maximizing the utilization of storage media 128, and by freeing up locked-up over provisioning and reducing write amplification.

Storage controller 124 uses wear leveling partition 212 to choose new victims by finding the block stripe with the lowest wear score. This ensures that invalid locations will eventually get freed up when garbage collection has resulted in block stripes that have some invalid data, but not enough to be chosen by the greedy garbage collection method discussed above. This releases locked-up over provisioning and reduces write amplification in general.

Since the wear leveling partition 212 is separate from the host 210 and garbage collection partitions 211, when a wear leveling victim doesn't entirely fill a new target block stripe, the next coldest stripe's data will be added to the target block stripe due to the fact that wear leveling always chooses the lowest wear score victim. Thus, there is a smaller chance of hot data getting reintroduced into the target stripe as a result of wear leveling.

When there are multiple candidates for wear leveling with the same wear score, storage controller 124 always chooses the candidate that was written least recently since it has a higher probability of containing cold data. This can be done using a block stripe sequence number, as described below in detail.

Storage controller 124 chooses new destination blocks by using a high wear bias. This provides a clean swap of cold data from cold blocks to hot blocks without having to perform the swap explicitly, as long as some small number of spare blocks are present.

Storage controller 124 begins wear leveling after the difference between the lowest and highest wear score blocks (the "wear score spread") reaches a configurable value. The maximum wear score spread is configurable because the allowed spread affects some mixtures of hot and cold data differently. A configurable default value for the maximum wear score spread can be used that benefits all workloads, even if the configured value could be adjusted for even greater optimization.

This method provides protection against "runaway" wear leveling using a quantity of tunable variables. Simulations show that if, when wear leveling is required, the number of wear leveling writes is throttled at a 1:1 ratio with new host writes, the wear score spread remains constant. This provides an upper bound on the write amplification generated by wear leveling (i.e., a maximum increase of 1 during wear leveling). This value is configurable so that this upper bound can be controlled.

In this example method, hot blocks are held on "cooling lists" until absolutely needed. The method places any blocks with wear scores larger than (current minimum wear score+ maximum wear score spread+a configurable value) on a cooling list to be chosen only when no other blocks are available. This prevents any block from moving toward the maximum wear score too quickly as new blocks are chosen by the wear leveling partition 212.

This also allows the wear leveling method's maximum wear score spread to be adjusted during the life of the storage drive 120 by holding hotter blocks in reserve if the maximum wear score spread is decreased.

Block stripes with valid data can be excluded from the wear leveling process until the stripes have reached a certain "age." In an example embodiment, an always incremented sequence number is recorded each time a stripe is erased and used for new data by any of the partitions. Stripes are excluded from the wear leveling process until their sequence number is greater than some configurable value away from the newest sequence number.

This helps the method deal with outliers on the low wear score end. Some stripes could hold system data that is rarely rewritten and not included in one of the three partitions 210, 211, and 212 described above. If or when that data is re-written, blocks could be released with low wear scores that are desirable to be used for new data. This setting allows the new blocks to be used slowly while the wear score spread is maintained among the blocks that originally held data written by the host 110. Modeling has shown that using this age heuristic can help the process use newly available young blocks slowly while keeping the wear score spread of the rest of the blocks within the target threshold.

In this example embodiment, only host writes flow to the host partition cursor 204. Once written to the host partition 210, this data can only flow to either the garbage collection partition 211 via a "least valid" triggered operation (indicated as "A" 213 in FIG. 2), or the wear leveling partition 212 via a "low wear score" triggered operation (indicated as "B" 214 in FIG. 2). The block stripes involved with least valid/low wear score triggered operations may come from the host partition 210, garbage collection partition 211, or wear leveling partition 212.

In example embodiments, with larger over provisioning configurations, using wear leveling to release the overprovisioning faster, results in achieving an even lower write amplification faster.

Wear leveling serves two purposes, actual wear leveling, and data compaction. In some example embodiments, those two purposes are explicitly separated.

Given the concept of a block stripe "age" (i.e., the difference between its sequence number and the last assigned sequence number), this age is useful in determining when there are low valid count stripes that aren't getting garbage collected.

In some example embodiments, several steps are added to the wear leveling method. If wear leveling is required, that always takes precedence and the data is moved to higher erase count blocks as described above.

When wear leveling is not required several additional steps may be performed. In these example embodiments, the wear leveling method searches for and identifies any block stripes that have a sequence number less than some configurable value from the most recently assigned sequence number. This configurable value should be chosen to be large enough to indicate that the stripe is cold enough to move. An initial value is chosen such that no stripe would meet this criterion under steady-state 100% random conditions.

In these example embodiments, the wear leveling method finds the least valid block stripe that meets this criterion. There is also a configurable valid data threshold that indicates the most valid data a stripe can contain be before a stripe can be a victim. For example, a stripe is not moved if it is 95% full or greater. This serves to prevent thrashing if the stripe actually had some small amount of hot data or flush data in it.

The wear leveling method also migrates that block stripe into the high wear bias partition by moving the valid data from that block stripe into a high wear bias block stripe. This means the method is speculatively assuming that this data will remain cold, so that is why it is moved into hot blocks. Under certain workloads, the age threshold needs to be adjusted if it results in the method assuming that data is cold too quickly.

In the case that the method is moving data due to wear leveling (i.e., because of the erase count difference), it is only moving the stripe if it finds blocks with a wear score more than half the max wear score away from its current score. In these example embodiments, it is inefficient to spend a lot of time moving very old data into blocks with an erase count of 1, where these data blocks will likely just be moved in the near future as the erase count spread increases by 1 again.

In the case where the wear leveling method is moving data for data compaction, the movement is not limited to be a minimum distance away in terms of erase count. This is because there is benefit to freeing up over provisioning in those stripes, even if moving to a stripe with an erase count that is not much different than its current erase count.

Since wear leveling is a well-known problem in the SSD industry, models were used to simulate wear leveling behavior with one or two cursors in comparison to the three cursors 204, 205, and 206 used by the present invention.

A single partition solution, using only a host partition with a low wear bias was simulated. A dual partition solution, with the second partition devoted to wear leveling, where the host partition used a low wear bias and the wear leveling partition used a high wear bias was also simulated. Finally, a dual partition solution, with the second partition devoted to both garbage collection and wear leveling, where the host partition used a low wear bias and the garbage collection/ wear leveling partition used a high wear bias was also simulated.

The results of the simulations show that the three-partition method discussed herein increases drive life while either lowering write amp or having a very small effect on write amp in the presence of hot and cold data. The one and two partition solutions behave better under some workloads than others, while the three-partition method discussed herein performs consistently across a wider variety of workloads.

The example embodiments presented herein provide for a method that can limit write amp while extending drive life under scenarios that include hot and cold data. This can be done with not substantial effect on critical benchmark tests or other scenarios where all data is hot.

A wear leveling algorithm that uses three or more partitions is more efficient because it reduces the amount of data mixing when choosing victims for migration for different reasons. Pacing wear leveling writes proportionally to the rate of accepting new host data provides an upper bound on write amp induced by wear leveling, while still allowing the algorithm to maintain a fixed wear score spread.

Choosing a wear leveling candidate with an age heuristic can help the process deal with low-erase count outliers that may be introduced due to other factors than the writes that are coming from the host. Modeling has shown that with the wrong wear leveling algorithm, maintaining a constant wear score spread on its own does not necessarily increase the drive life. However, with the proposed method described herein, it does increase drive life over a broad range of scenarios.

Based on the additional simulations described herein, having a wear leveling partition without a GC partition, or having a GC partition without a wear leveling partition extends drive life in some cases but not others. In other words, wear leveling without hot/cold data separation (using a GC partition) doesn't work well generally, and hot and cold data separation without wear leveling doesn't work well generally, either.

Wear leveling can choose the hottest blocks for cold data because it is anticipated that this data will not be re-written for a long time. Therefore, writing cold data to hot blocks allows the data to remain in the block until the rest of the blocks catch up to it as hot data is rewritten to colder blocks.

The use of a cooling list to set blocks aside that have high wear scores, until the rest of the blocks catch up with them, limits the risk of choosing hot blocks for cold data. The cooling list allows the algorithm to find the hottest blocks that are not outliers for writing cold data.

Figure 3:
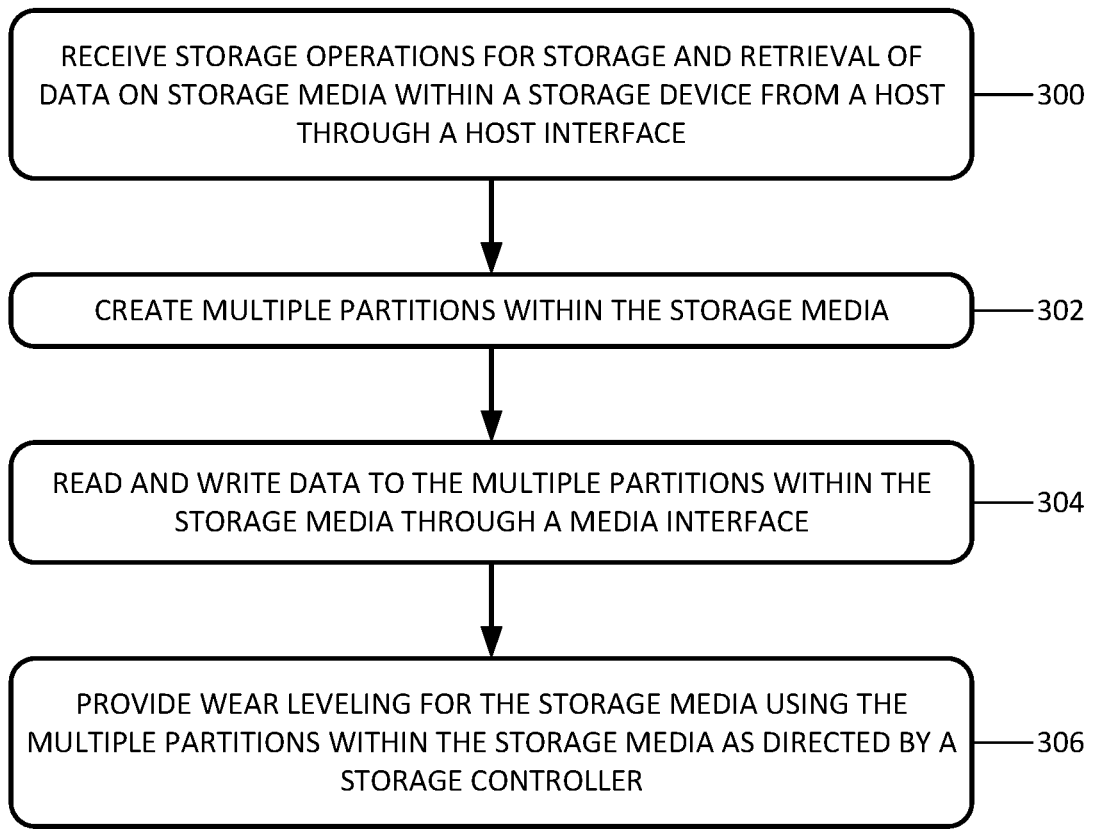
FIG. 3 is a flow chart illustrating an exemplary method for adaptive wear leveling on multiple partitions within storage media.

FIG. 3 is a flow chart illustrating an exemplary method for adaptive wear leveling on multiple partitions 131, 132, and 133 within storage media 128. In this example method, storage device 120 receives storage operations for storage and retrieval of data on storage media 128 within the storage device 120 from a host 110 through a host interface 122, (operation 300).

Storage controller 124 creates multiple partitions 131, 132, and 133 within the storage media 128, (operation 302). Storage device 120 reads and writes data to the multiple partitions 131, 132, and 133 within the storage media 128 through a media interface 126, (operation 304).

Storage device 120 provides wear leveling for the storage media 128 using the multiple partitions 131, 132, and 133 within the storage media 128 as directed by storage controller 124, (operation 306).

Figure 4:
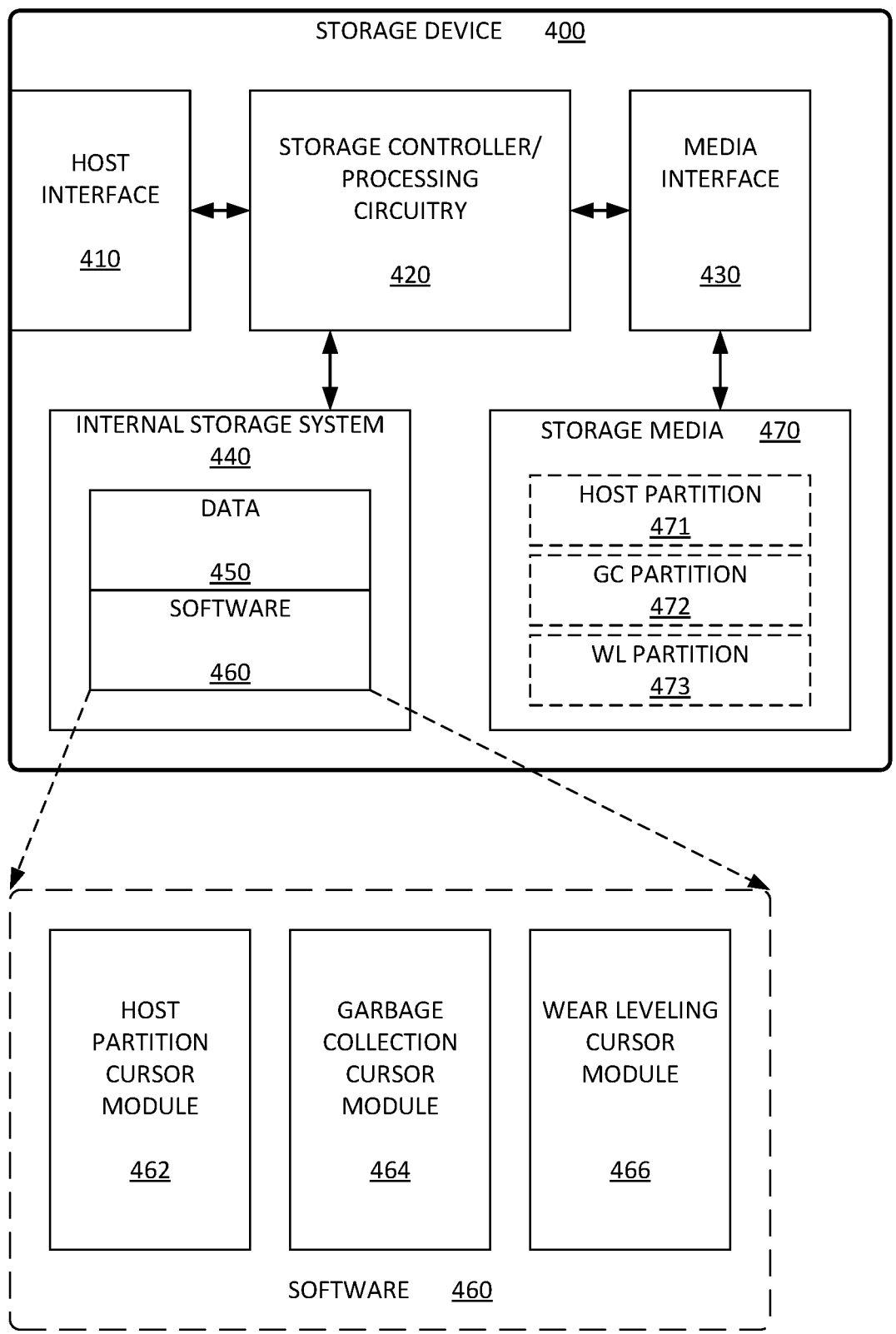
FIG. 4 illustrates a storage device.

FIG. 4 illustrates storage device 400, such as some or all of storage device 120 from FIG. 1. As discussed above, storage device 400 may take on any of a wide variety of configurations. Here, an example configuration is provided for a storage controller/processing circuitry 420 and accompanying interfaces and modules implemented as an ASIC. However, in other examples, storage controller 420 may be built into a storage system or storage array.

In this example embodiment, storage device 400 comprises host interface 410, storage controller/processing circuitry 420, media interface 430, internal storage system 440, and storage media 470. Storage media 471 includes host partition 471, garbage collection partition 472, and wear leveling partition 473. Host interface 410 comprises circuitry configured to receive data and commands from one or more external host systems and to send data to the host systems.

Media interface 430 comprises circuitry configured to send data and commands to storage media 470 and to receive data from the storage media 470. In some embodiments storage interface 430 may include ONFI ports for communicating with the storage media.

Storage controller/processing circuitry 420 comprises electronic circuitry configured to perform the tasks of a storage controller enabled to partition a write data stream into target partitions and inferred partitions as described above. Storage controller/processing circuitry 420 may comprise microprocessors and other circuitry that retrieves and executes software 460. Storage controller/processing circuitry 420 may be embedded in a storage system in some embodiments. Examples of storage controller/processing circuitry 420 include general purpose central processing units, application specific processors, and logic devices, as well as any other type of processing device, combinations, or variations thereof. Storage controller/processing circuitry 420 can be implemented within a single processing device but can also be distributed across multiple processing devices or sub-systems that cooperate in executing program instructions.

Internal storage system 440 can comprise any non-transitory computer readable storage media capable of storing software 460 that is executable by storage controller/processing circuitry 420. Internal storage system 420 can also include various data structures 450 which comprise one or more databases, tables, lists, or other data structures. Storage system 440 can include volatile and nonvolatile, removable and non-removable media implemented in any method or technology for storage of information, such as computer readable instructions, data structures, program modules, or other data.

Storage system 440 can be implemented as a single storage device but can also be implemented across multiple storage devices or sub-systems co-located or distributed relative to each other. Storage system 440 can comprise additional elements, such as a controller, capable of communicating with storage controller/processing circuitry 420. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof.

Software 460 can be implemented in program instructions and among other functions can, when executed by storage device 400 in general or storage controller/processing circuitry 420 in particular, direct storage device 400, or storage controller/processing circuitry 420, to operate as described herein for a storage controller. Software 460 can include additional processes, programs, or components, such as operating system software, database software, or application software. Software 460 can also comprise firmware or some other form of machine-readable processing instructions executable by elements of processing circuitry 420.

In at least one implementation, the program instructions can include host partition cursor module 462, garbage collection cursor module 464, and wear leveling cursor module 466. These three modules when executed by storage controller/processing circuitry 420 perform the tasks of adaptive wear leveling as discussed in detail above with respect to FIG. 2.

In general, software 460 can, when loaded into storage controller/processing circuitry 420 and executed, transform storage controller/processing circuitry 420 overall from a general-purpose computing system into a special-purpose computing system customized to operate as described herein for a storage controller, among other operations. Encoding software 460 on internal storage system 440 can transform the physical structure of internal storage system 440. The specific transformation of the physical structure can depend on various factors in different implementations of this description. Examples of such factors can include, but are not limited to the technology used to implement the storage media of internal storage system 440 and whether the computer-storage media are characterized as primary or secondary storage.

For example, if the computer-storage media are implemented as semiconductor-based memory, software 460 can transform the physical state of the semiconductor memory when the program is encoded therein. For example, software 460 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above may be combined in various ways to form multiple embodiments. As a result, the invention is not limited to the specific embodiments described above, but only by the claims and their equivalents.

What is claimed is:

1. A storage device for adaptive wear leveling within a data storage system, comprising:
    a host interface configured to receive storage operations for storage and retrieval of data on storage media;
    a media interface configured to read and write data to the storage media; and
    a storage controller configured to provide wear leveling for the storage media using a plurality of partitions within the storage media, the plurality of partitions comprising a host partition, a garbage collection partition, and a wear leveling partition, wherein during periods when wear leveling is not required, the storage controller is configured to:
        identify a least valid block stripe having a sequence number less than a configurable threshold sequence number below a most recently assigned sequence number; and
        move valid data from the least valid block stripe having a sequence number less than the configurable threshold sequence number below the most recently assigned sequence number into a high wear bias block stripe.

2. The storage device of claim 1, wherein the storage controller comprises:
    a host partition cursor module configured to control the writing of block stripes to the host partition;
    a garbage collection partition cursor module configured to control the writing of block stripes to the garbage collection partition; and
    a wear leveling partition cursor module configured to control the writing of block stripes to the wear leveling partition.

3. The storage device of claim 1, wherein the storage controller is configured to choose target blocks within the host partition using a low wear bias.

4. The storage device of claim 1, wherein the storage controller is configured to choose target blocks within the garbage collection partition using a low wear bias.

5. The storage device of claim 1, wherein the storage controller is configured to choose new victims within the wear leveling partition by finding the block stripe with the lowest wear score, and to choose new destination blocks within the wear leveling partition using a high wear bias.

6. The storage device of claim 1, wherein the storage controller is configured to begin wear leveling after a difference in wear score between a lowest wear score block and a highest wear score block reaches a configurable maximum wear score spread value.

7. The storage device of claim 1, wherein the storage controller is configured to throttle wear leveling writes to a multiple of host writes.

8. The storage device of claim 1, wherein the storage controller is configured to place blocks with wear scores larger than a threshold on a cooling list to be chosen only when no other blocks are available for wear leveling.

9. The storage device of claim 1, wherein the storage controller is configured to exclude block stripes from wear leveling until the block stripes have reached an age threshold.

10. The storage device of claim 1, wherein when wear leveling is not required, the storage controller is configured to:
    move valid data from the least valid block stripe having a sequence number less than the configurable threshold sequence number below the most recently assigned sequence number into the high wear bias block stripe only if an amount of valid data in the identified least valid block stripe is less than a configurable valid data threshold.

11. A method for operating a storage device within a data storage system, the method comprising:
    receiving storage operations for storage and retrieval of data on storage media within the storage device from a host through a host interface;
    creating a plurality of partitions within the storage media;
    reading and writing data to the multiple partitions within the storage media through a media interface;
    providing wear leveling for the storage media using the plurality of partitions within the storage media as directed by a storage controller, the plurality of partitions comprising a host partition, a garbage collection partition, and a wear leveling partition; and
    during periods when wear leveling is not required:
        identifying a least valid block stripe having a sequence number less than a configurable threshold sequence number below a most recently assigned sequence number; and
        moving valid data from the least valid block stripe having a sequence number less than the configurable threshold sequence number below the most recently assigned sequence number into a high wear bias block stripe.

12. The method of claim 11, further comprising:
    controlling the writing of block stripes to the host partition with a host partition cursor module;
    controlling the writing of block stripes to the garbage collection partition with a garbage collection partition cursor module; and controlling the writing of block stripes to the wear leveling partition with a wear leveling partition cursor module.

13. The method of claim 11, further comprising:
choosing target blocks within the host partition using a low wear bias.

14. The method of claim 11, further comprising:
choosing target blocks within the garbage collection partition using a low wear bias.

15. The method of claim 11, further comprising:
choosing new victims within the wear leveling partition by finding the block stripe with the lowest wear score; and
choosing new destination blocks within the wear leveling partition using a high wear bias.

16. The method of claim 11, further comprising:
beginning wear leveling after a difference in wear score between a lowest wear score block and a highest wear score block reaches a configurable maximum wear score spread value.

17. The method of claim 11, further comprising:
throttling wear leveling writes to a multiple of host writes.

18. The method of claim 11, wherein when wear leveling is not required, the method further comprises:
moving valid data from the least valid block stripe having a sequence number less than the configurable threshold sequence number below the most recently assigned sequence number into the high wear bias block stripe only if an amount of valid data in the identified least valid block stripe is less than a configurable valid data threshold.

* * * * *